Figure 1:
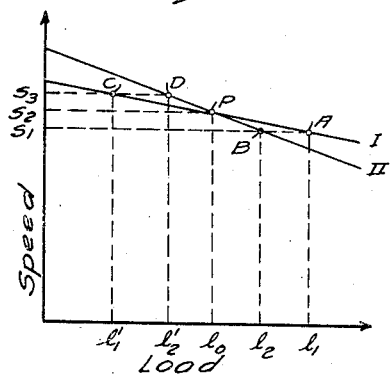

Dec. 28, 1937.  J. KUCERA  2,103,818
REGULATING SYSTEM
Filed March 13, 1937  2 Sheets-Sheet 1

WITNESSES:

INVENTOR
Jaroslav Kucera.
BY
ATTORNEY

Dec. 28, 1937.  J. KUCERA  2,103,818
REGULATING SYSTEM
Filed March 13, 1937   2 Sheets-Sheet 2

WITNESSES:
E. A. M'Closkey.
F. E. Hardy

INVENTOR
Jaroslav Kucera.
Ezra W. Savage
ATTORNEY

Patented Dec. 28, 1937

2,103,818

UNITED STATES PATENT OFFICE 2,103,818

REGULATING SYSTEM

Jaroslav Kucera, Prague, Czechoslovakia, assignor to Westinghouse Electric & Manufacturing Company, East Pittsburgh, Pa., a corporation of Pennsylvania Application March 13, 1937, Serial No. 130,708
In Czechoslovakia March 16, 1936

8 Claims. (Cl. 290—4)

My invention relates to regulator systems and particularly to systems for regulating alternating current generators operating in parallel.

When a plurality of synchronous generators are operated in parallel, their power output depends on the setting of the speed regulators on the governors controlling the individual prime movers driving the generators. The reactive current output depends on the excitation of the individual generators and, therefore, on the setting of the voltage regulators controlling them. In practice, it is frequently difficult to maintain the proper distribution of load between several generators operating in parallel within a central station because the load on the station varies considerably and the speed regulators controlling the several prime movers have different speed characteristics.

It is an object of this invention to provide a regulator system for alternating current electric generators connected in parallel that is adapted to maintain a desirable load distribution between the several generators throughout a large range in station load.

It is a further object of this invention to maintain a desired distribution of the reactive current as well as the power current components of the load between the parallel operated generators.

Figure 2:
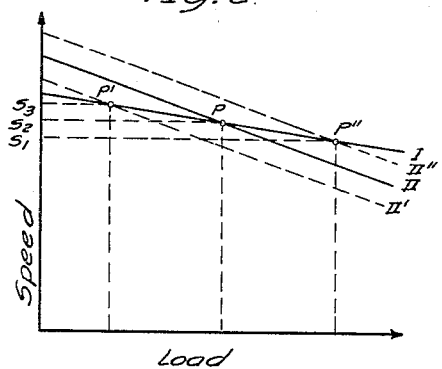
Figure 4:
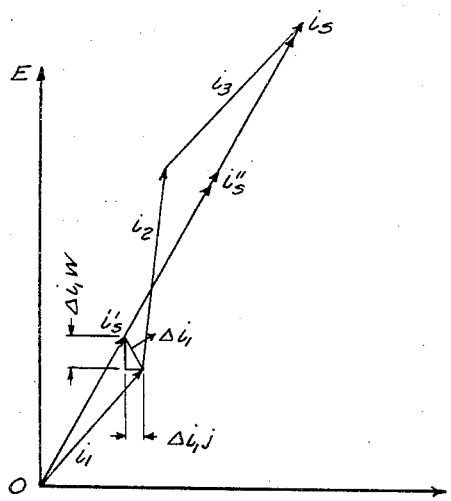
Figure 3:
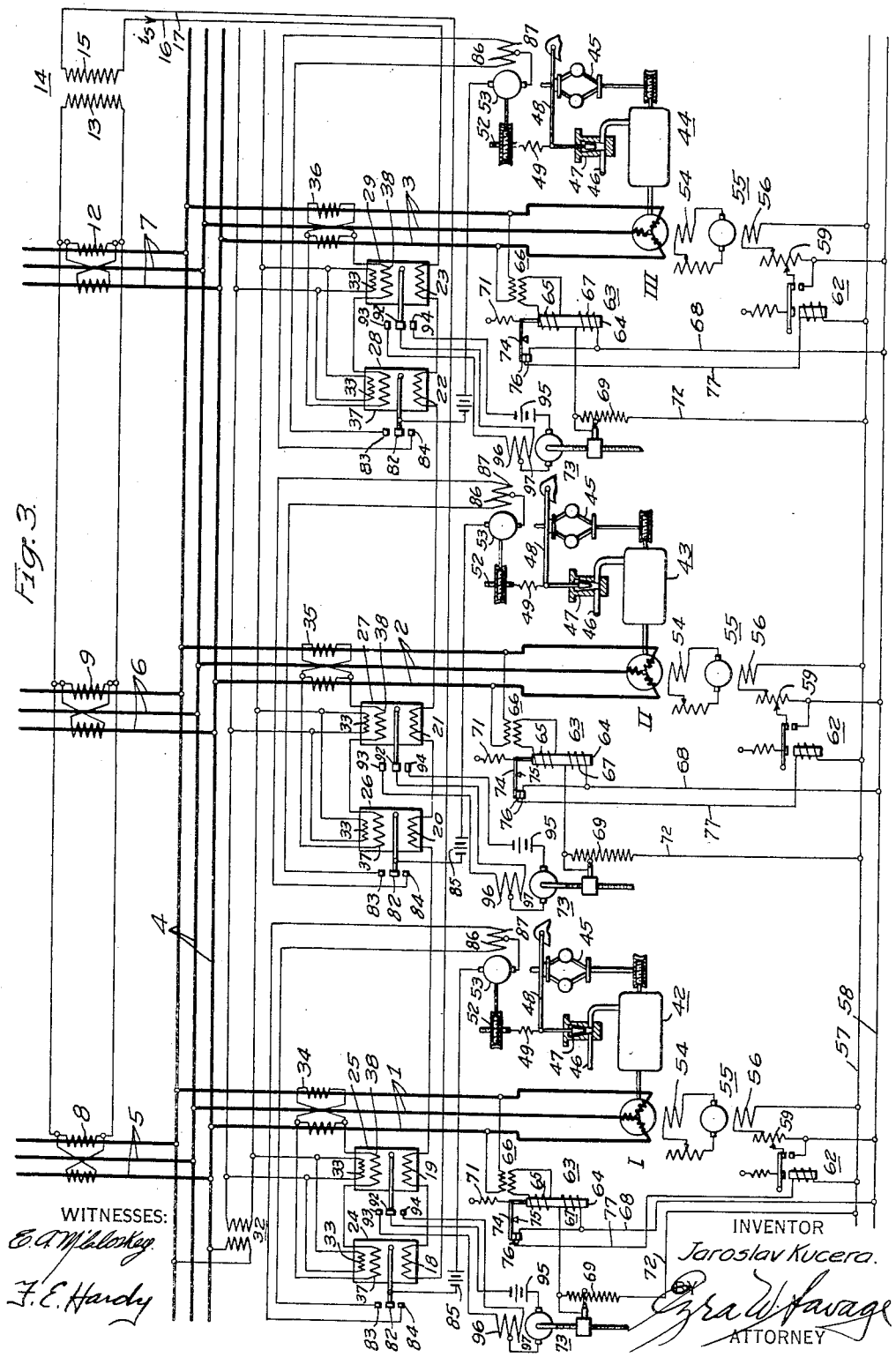

In the drawings,

Figures 1 and 2 are diagrammatic views showing curves illustrating certain characteristics of speed regulators commonly employed for controlling generator prime movers, Fig. 3 is a diagrammatic view of circuits and apparatus illustrating one preferred embodiment of the invention, and Fig. 4 is a vector diagram illustrating the relation of certain component currents in various parts of the system illustrated in Fig. 3.

Referring to the drawings, the curves I and II illustrate the speed characteristics of two regulators controlling the prime movers of generators operating in parallel, the speed of the machines being plotted along the vertical axis against the loading of the machine which is plotted along the horizontal axis. It will be noted that the curve I is the flatter characteristic and represents a governing mechanism in which the change in revolutions per minute varies with respect to load to a lesser degree than the regulator represented by the curve II having the steeper speed load characteristic.

If the generators controlled by the two units having the speed load characteristics represented by the curves I and II are operated in parallel, the speed must remain the same for all values of load because of the nature of synchronous machines connected together, and the vector sum of the load of the two machines will represent the total load of the station. If the machines are operating at a speed represented by the ordinate $S_1$ and we trace along the abscissa corresponding to this speed, the dotted line will intersect the characteristic curves I and II at the points A and B respectively, indicating a load output of $l_1$ and $l_2$, respectively, the load on machine II, as indicated, being less than that on machine I. Should the speed of the machines increase to the value represented by the ordinate $S_2$ corresponding to the point of intersection P of the curves I and II, the load on each machine will be $l_0$. If the machine speeds increase to the value represented by the ordinate $S_3$, the abscissa corresponding to this speed intersects the curves I and II at the points C and D, respectively, corresponding to loads $l'_1$ and $l'_2$. It will be noted, therefore, that as the speed changes from $S_1$ to $S_2$, the load on machine I decreases from $l_1$ to $l'_1$, while the load on machine II decreases from the value $l_2$ to the value $l'_2$ so that at the lower speed, the machine I is carrying the greater load while at the highest speed, the machine II is carrying the greater load.

It is obvious, therefore, that as the total loading of the two machines increases, the loading on the machine represented by the flatter characteristic I increases much faster than the loading on the machine having the steeper characteristic II and, at high overloads on the station, the loading on the first machine may reach the limit of instability considerably before the maximum permissible load on the machine II is reached.

It will be apparent, therefore, that if the same division of load is to be maintained on the two machines between the speeds $S_1$ and $S_3$, it will be necessary to change the position of the characteristic curve of one of the machines vertically. If the characteristic curve I is to be taken as standard, the curve II must be shifted vertically if the characteristic curves of the two machines are to intersect at the same load points for different station loads, such as P', P, and P'' represented in Fig. 2.

As above indicated, the division in the reactive load on the two machines depends on the excitation of the individual alternators. The alternator with the higher field excitation has the greater overload capacity and delivers a greater proportion of the reactive energy than does the machine with the lower excitation, which latter machine, therefore, is the less stable. Consequently the machine having the lower excitation may more easily be pulled out of synchronism with the frequency of the power system. For stable parallel operation, therefore, it is necessary to maintain a proper distribution of both the power component of load current and the reactive component of load current between the several synchronous generators.

The apparatus and circuits illustrated in Fig. 3 represent one preferred embodiment of the invention for maintaining a desired distribution of load current and reactive current between parallel operated generators. In the drawings, three synchronous generators I, II, and III are illustrated connected by three phase circuit conductors 1, 2, and 3, respectively, to common bus bar conductors 4 from which distribution or feeder circuits represented by the three phase conductors 5, 6, and 7 supply power to the desired load centers. Current transformers 8, 9, and 12 are connected, respectively, to the feeder circuits 5, 6, and 7 and to the primary winding 13 of a transformer 14 for totalizing the total output current from the station, a measure of which flows through the secondary transformer winding 15 and by circuit conductors 16 and 17 through windings 18, 19, 20, 21, 22 and 23 of relays 24, 25, 26, 27, 28, and 29, respectively, the current in this circuit being a regulating current for effecting the control of the power input to, and excitation of, the several parallel operated generators. The relays 24, 26, and 28 are arranged to be responsive to the power components from their associated generating units and the relays 25, 27, and 29 are arranged to be responsive to the reactive current components of their respective associated generator unit. A voltage transformer 32 is provided for supplying voltage of the same phase to the several relay windings 33 associated with each of six relays and current transformers 34, 35, and 36 are provided responsive to the current outputs of the units I, II, and III, respectively, for supplying current to the windings 37 of the balancing power relays 24, 26, and 28 and to the windings 38 of the balancing reactive relays 25, 27, and 29.

Prime movers 42, 43, and 44 are provided associated, respectively, with the generators I, II, and III, each prime mover being provided with a speed governing mechanism represented by the flyball governor 45 for controlling the supply of motive fluid through a conduit 46 by means of a valve 47. The valve is operated in accordance with movements of the lever 48 that is controlled in part by the governor balls 45 and in part by the tension of a spring 49, the setting of which is effected through gearing mechanism 52 by a pilot motor 53.

Each synchronous generator is also provided with a field winding 54 that is energized from an exciter generator 55 having a field winding 56 that may be excited from any suitable source such as the supply conductors 57 and 58. A resistor 59 is provided in circuit with the exciter generator field winding 56 for controlling the voltage output thereof and the excitation of the synchronous machine is controlled by a relay 62 that is governed by a voltage regulator 63 having a magnetic core 64 that is energized by a winding 65 through a transformer 66 in accordance with the generator voltage of the associated synchronous generator. A winding 67 is also provided that is energized from the supply conductors 57 and 58 through conductor 68, a variable resistor 69, and conductor 72, the resistor 69 being controlled by a pilot motor 73 in accordance with the operation of the balancing reactive relay 25. The downward pull of the magnet 64 acting against the bias of an adjusting spring 71 effects the rocking of the lever 74 about a pivot 75 to alternately close and interrupt a circuit through the contact members 76 that extends from the supply conductor 57 through the winding of the relay 62, conductor 77, the regulator contact members 76 and conductor 68 to supply conductor 58 to operate the field control relay 62 in a well known manner to control the excitation of the associated synchronous generator.

The generating units II and III are controlled in a similar manner by their associated power and reactive balancing relays in accordance with the particular adjustments of these relays to regulate for some given proportion of power and reactive currents from the respective machines.

Referring to Fig. 4, the regulating current made up of the vector summation of the three currents in the distribution or feeder circuits as measured by the current transformers 8, 9, and 12 and reproduced in the circuit conductors 16 and 17 is represented by the vector $oi_s$. When the desired distribution of load and reactive current exists between the several parallel operated machines, the balancing power relays 24, 26, and 28, and also the balancing reactive relays 25, 27, and 29 will be in their illustrated positions in which the movable contact member of each relay is out of engagement with the cooperating fixed contact members. In this condition, the current vectors represented by the current outputs of the individual machines as measured by the current transformers 34, 35, and 36, respectively, correspond to the proportions of the total vector $oi_s$ assigned to the individual machines. If, for example, the regulating equipment is so adjusted that the three machines will carry an equal proportion of the total station load, these will be represented by the three equal vectors $oi'_s$, $i'_s - i''_s$, and $i''_s - i_s$. If, for example, the current output of the transformers 34, 35, and 36 varies from the desired condition in a manner represented by the three vectors $i_1$, $i_2$, and $i_3$ in Fig. 4, the desired load distribution between the generators is disturbed and the several balancing power relays 24, 26, and 28, and also the several balancing reactive relays 25, 27, and 29 will be brought into operation to reestablish the desired load distribution.

Referring to the operation of the regulating mechanism for machine I, when the current vector representing the output of machine I varies from the desired position represented by vector $oi'_s$ to the position represented by the vector $i_1$, a certain differential current represented by $\Delta i_1$ appears between the ends of the vectors $i_1$ and $i'_s$. The power component $\Delta i_1 W$ of this current is parallel to the voltage vector E, being represented by the difference in current through the windings 37 and 18 of the relay 24, and causes the relay 24 to so operate that the movable contact member 82 is brought into engagement with one of the fixed contact members 83 or 84 to close a circuit from the battery 85 through the appropriate field winding 86 or 87 of the pilot motor 53 to operate it in a direction to vary the setting of the governor mechanism to increase the power input to the prime mover 42, to thus increase the power component of the vector $i_1$ so that it will correspond with the power component of the vector $oi'_s$ and eliminate the increment $\Delta i_1 W$. At the same time, the differential reactive current component represented by the increment $\Delta i_1 j$, which is perpendicular to the voltage vector E and is represented by the differential currents in the windings 38 and 19 of the balancing reactive relay 25, causes the relay 25 to so operate as to bring the movable relay contact member 92 into engagement with the appropriate fixed contact member 93 or 94 to energize the pilot motor 73 from the battery 95 through the appropriate field winding 96 or 97 to cause the motor 73 to operate in a direction to vary the adjusting resistor 69 so as to cause the regulator 63 to effect a reduction in the excitation of the machine I necessary to decrease the reactive component of the vector $i_1$ to a value corresponding to that of the vector $oi'_s$. A corresponding operation of the balancing power relays and balancing reactive relays associated with the synchronous generators II and III will be effected to cause the machine conditions represented by the vectors $i_2$ and $i_3$ to be so adjusted that these vectors become realigned with the desired portions of the regulating vector $oi'_s$.

Many modifications of the particular arrangement disclosed may be made, such for example as employing a regulating current that is a measure of the output of certain machines only, or a regulating current to control certain machines where it is desired that they operate at a fixed load instead of a variable load. In this case, a regulating current $i_s$ of appropriate phase angle relation to the generator voltage may be supplied to conductors 16 and 17 through an induction regulator or other suitable means from a source that is independent of the generator output.

Many modifications may be made in the apparatus and circuits illustrated without departing from the spirit of my invention and I do not wish to be limited otherwise than by the scope of the appended claims.

I claim as my invention:

1. In combination, a plurality of synchronous generators operating in parallel circuit relation, individual prime movers for driving the several generators, means associated with each prime mover for varying the power input thereto, means responsive to a regulated quantity resulting from the operation of said several generators for controlling the power input to said prime movers, regulating means associated with each prime mover for varying the excitation thereof, and means responsive to the regulated quantity resulting from the operation of said several generators for controlling the setting of said regulating means.

2. In combination, a plurality of electrical generators operating in parallel circuit relation, a separate prime mover for driving each of said generators, means associated with each prime mover for varying the power input thereto, means responsive to a regulated quantity determined by the joint output of said several generators for controlling the power input to said prime movers, means associated with each generator for varying the excitation thereof, and means responsive to a regulated quantity determined by the joint output of said several generators for controlling the excitation of said generators.

3. In combination, a plurality of electrical generators operating in parallel circuit relation, a separate prime mover for driving each of said generators, means associated with each prime mover for varying the power input thereto, means responsive to the power output of said group of generators for controlling the power input to said several generators to maintain a predetermined power output ratio between said several generators, voltage responsive means associated with each generator for controlling the excitation thereof, and means responsive to the output of said group of generators for controlling said voltage responsive means to maintain a desired reactive current relation between said several generators.

4. In a regulating system, a plurality of synchronous generators connected to operate in parallel circuit relation, a separate prime mover for supplying power to each of said generators, a governor for controlling the speed of each prime mover, adjusting means for varying the setting of each governor, means responsive to the group output of said generators for varying the settings of said several governor mechanisms, a voltage regulator for controlling the excitation of each generator, adjusting means for varying the setting of each regulator, and means responsive to the group output of said generators for varying the settings of said regulators.

5. In a regulating system, a plurality of synchronous generators connected to operate in parallel circuit relation, a separate prime mover for supplying power to each of said generators, a governor for controlling the speed of each prime mover, adjusting means for varying the setting of each governor, electroresponsive means responsive to the group output of said generators for controlling the setting of said governor mechanisms to maintain a desired load balance between the generators, regulating means for controlling the excitation of each generator, adjusting means for controlling the setting of said regulating means, and electroresponsive means responsive to the total output current of the group of generators for controlling the setting of said regulating means to maintain a desired balance in the reactive current from said generators.

6. In a regulating system, a plurality of synchronous generators connected to operate in parallel circuit relation, a separate prime mover for supplying power to each of said generators, a governor for controlling the speed of each prime mover, adjusting means for varying the setting of each governor, a regulating current that is proportional in magnitude to the vector sum of the currents from the several generators, means responsive to said regulating current for controlling the setting of said governor mechanisms to maintain a desired ratio between the power components of said generator current and said regulating current, regulating means for controlling the excitation of each generator, adjusting means for controlling the setting of said regulating means, and means responsive to said regulating current for controlling the setting of said regulating means to maintain a desired ratio between the reactive component of said generator current and said regulating current.

7. In combination, a plurality of electrical generators operating in parallel circuit relation, a separate prime mover for driving each of said generators, means associated with each prime mover for varying the power input thereto, means for developing a regulating current that is a measure of the vector sum of the currents from the several generators, means responsive to said regulating current for controlling the power input to said prime movers, means associated with each generator for varying the excitation thereof, and means responsive to said regulating current for controlling the excitation of said generators.

8. In a regulating system, a plurality of synchronous generators connected to operate in parallel circuit relation, a separate prime mover for supplying power to each of said generators, a governor for controlling the speed of each prime mover, voltage regulating means for controlling the excitation of each generator, means for developing a regulating current that is a measure of the load and reactive current desired from said several generators, means associated with each generator including a balancing power relay sensitive to variations in the load current delivered by said generator from the desired value for adjusting the setting of the governor, and means associated with each generator including a balancing relay sensitive to variations in the reactive current from its desired value for varying the setting of said voltage regulating means.

JAROSLAV KUCERA.